United States Patent [19]
Obara et al.

[11] Patent Number: 5,610,483
[45] Date of Patent: Mar. 11, 1997

[54] CONTROL EQUIPMENT FOR ELECTRIC VEHICLE AND CONTROL METHOD THEREOF

[75] Inventors: Sanshiro Obara, Toukai; Hiroyuki Yamada, Hitachinaka; Nobunori Matsudaira; Ryoso Masaki, both of Hitachi, all of Japan

[73] Assignees: Hitachi Ltd., Tokyo; Hitachi Automotive Engineering Co., Ltd., Ibaraki, both of Japan

[21] Appl. No.: 405,769

[22] Filed: Mar. 17, 1995

[30] Foreign Application Priority Data

Mar. 18, 1994 [JP] Japan .................................. 6-048450

[51] Int. Cl.⁶ .................................................. B60L 15/20
[52] U.S. Cl. .......................... 318/139; 318/432; 318/448; 318/460
[58] Field of Search ..................................... 318/611, 615, 318/618, 623, 629, 139, 432, 448, 460

[56] References Cited

U.S. PATENT DOCUMENTS 3,643,073  2/1972  Sawamura .
4,636,700  1/1987  Moore et al. .
4,934,731  6/1990  Hiwatashi et al. .
4,993,389  2/1991  Ahlborn et al. .
5,332,061  7/1994  Majeed et al. .
5,349,278  9/1994  Wedeen .
5,451,852  9/1995  Gusakov .

FOREIGN PATENT DOCUMENTS 4-145806  5/1992  Japan .

Primary Examiner—Bentsu Ro
Attorney, Agent, or Firm—Evenson, McKeown, Edwards & Lenahan, P.L.L.C.

[57] ABSTRACT

A control equipment for controlling a current to the motor provided in an electric vehicle is disclosed. The control equipment has a motor torque control means for inputting the motor speed No and the motor current, and generating an inverter drive signal to control the torque of the motor, a notch filter for eliminating the mechanical resonance frequency; and a torque command generating means for generating the torque command.

The control equipment for an electric vehicle is not influenced by the mechanical vibration of the electric vehicle, can generate the accurate motor torque command, and can execute the stable running control.

5 Claims, 5 Drawing Sheets

CONTROL EQUIPMENT FOR ELECTRIC VEHICLE AND CONTROL METHOD THEREOF

BACKGROUND OF THE INVENTION

1. Field of the Invention

The present invention relates to a control equipment for an electric vehicle and control method thereof, more particularly to the control equipment and control method suitable to suppress the vibration of an electric vehicle.

2. Description of the Prior Art

Generally, a plurality of elastic members such as elastic shafts and couplings are used to transmit the torque from a motor to an electric vehicle. Thus, the electric vehicle forms an elastic system as a whole. As a result, the mechanical vibration of the electric vehicle may occur when the motor torque changes suddenly. The mechanical vibration makes the driver uncomfortable.

In order to solve the above problem, for example, Japanese Patent Application Laid-open No. 4-145806 (1993) discloses an electric vehicle provided with a torque control equipment for controlling a motor current so as to suppress such the vibration, in which the torque control equipment includes vibration detecting means for detecting the vibration of the electric vehicle.

In the construction described above, the vibration of the electric vehicle is detected, and the current supplied to the motor can be increased or decreased when the vibration of the electric vehicle occurred. As a result, the vibration of the electric vehicle can be suppressed and the uncomfortable condition during driving can be avoid.

However, in the conventional vibration suppression technique, if the components of vibration enter the motor speed owing to the mechanical resonance vibration of the electric vehicle generated when the motor torque is changed suddenly, for example, by the quick acceleration, the stable control operation may be disturbed. This mechanical vibration of the electric vehicle may occur when the electric vehicle is accelerated from the initial speed of the medium speed, for example, when accelerated from 80 km/h to 100 km/h.

SUMMARY OF THE INVENTION

An object of the present invention is to provide a control equipment for an electric vehicle and a control method thereof, which is not influenced by the mechanical vibration of the electric vehicle, can generate the accurate motor torque command, and can execute the stable running control.

Other objects and features of the present invention will be more apparent to those skilled in the art on consideration of the accompanying drawings and following specification wherein are disclosed several exemplary embodiments of the invention with the understanding that such variations, modifications and elimination of parts may be made therein as fall within the scope of the appended claims without departing from the spirit of the invention.

According to an aspect of the present invention, in the electric vehicle comprising a battery, a motor to drive wheels, and a control equipment for controlling a current to the motor, the control equipment comprising: a motor torque control means for inputting the motor speed No detected by an encoder and the motor current detected by a current sensor, and generating an inverter drive signal to control the motor torque, on the basis of a torque command; a notch filter for eliminating at least one mechanical resonance frequency of the wheel drive system on the basis of the information of the motor speed No; a torque command generating means for inputting the actuating amount of an accelerator and the motor speed Nr obtained through the notch filter, and generating the torque command.

According to another aspect of the present invention, in a method of controlling an electric vehicle which comprises a battery, a motor to drive wheels, means for detecting a motor speed No, a current sensor for detecting the current to the motor, and a control equipment for controlling the current to the motor, the control equipment including torque command generating means and motor torque control means, the steps of: obtaining a motor speed Nr in which at least one mechanical resonance frequency is eliminated from the motor speed No by a notch filter; obtaining a torque command by inputting an actuating amount of an accelerator and the motor speed Nr, and executing an arithmetic processing in the torque command generating means; producing an inverter drive signal for controlling the motor torque on the basis of the motor speed No, the motor current and the torque command, in the motor torque control means.

The mechanical resonance frequency has a characteristic value every vehicle. For example, the characteristic value is equal to 3.3 Hz through 6 Hz in a passenger car. The torque generating means inputs motor speed information which does not include the resonance frequency, which is obtained by causing the motor speed information which includes the characteristic resonance frequency to pass through the notch filter. As a result, it becomes possible to execute the stable running control, because the torque command generating means can generate the torque command which does not include the component of vibration, even when the mechanical resonance occurs due to the sudden change of torque.

DETAILED DESCRIPTION OF THE PREFERRED EMBODIMENTS

The present invention will be explained hereinafter with reference to the drawings.

Figure 1:
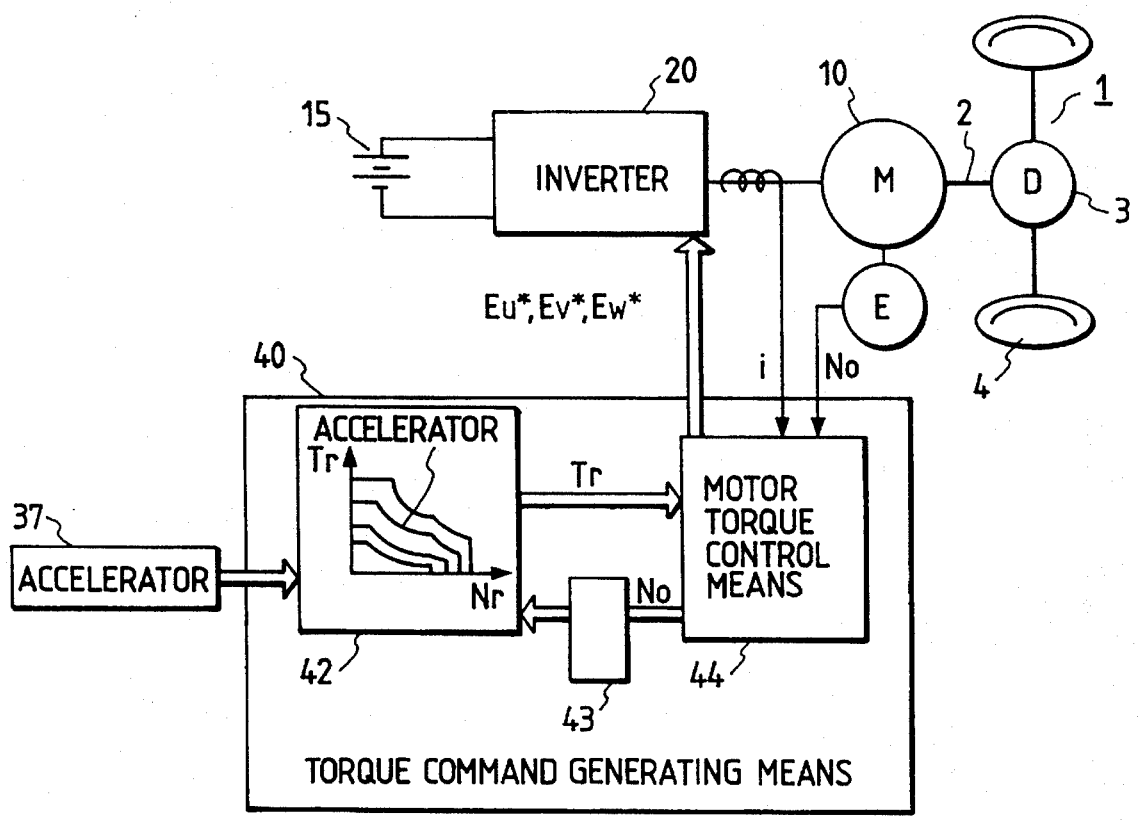
FIG. 1 is a block diagram showing the whole construction of an electric vehicle according to an embodiment of the present invention.

FIG. 1 shows the whole construction of an electric vehicle according to an embodiment of the present invention. In FIG. 1, reference numeral 1 designates a electric vehicle. The output of a motor 10 is transmitted to wheels 4 via a reduction gear 3. The DC voltage of a battery 15 is inverted to a three-phase alternating current by an inverter 20. The three-phase alternating current is supplied to the motor 10. The inverter 20 controls the frequency and the voltage, thus the torque of motor 10. As a result, the running speed of the electric vehicle 1 can be controlled. Numeral 40 designates a torque control means which includes a torque command generating means 42, a notch filter 43 and a motor torque control means 44. The torque command generating means 42 inputs the actuating amount of an accelerator 37 and a motor speed Nr obtained through the notch filter 43, and produces the torque command Tr based on the predetermined characteristic.

The motor torque control means 44 inputs the motor speed No detected by an encoder 36, a motor current i detected by a current sensor 30 and the torque command Tr, produces reference signals Eu*, Ev*, Ew* to obtain a motor torque tM, and controls the inverter 20.

The notch filter 43 is used to eliminate a specific frequency corresponding to the mechanical resonance frequency of the electric vehicle. The notch filter may be constructed by an analog circuit using CR, or by the software utilizing a digital arithmetic circuit. By using the notch filter, the amplitude of 6.0 Hz frequency component is reduced from the motor speed signal N, and thus the motor speed signal Nr can be obtained.

Figure 2:
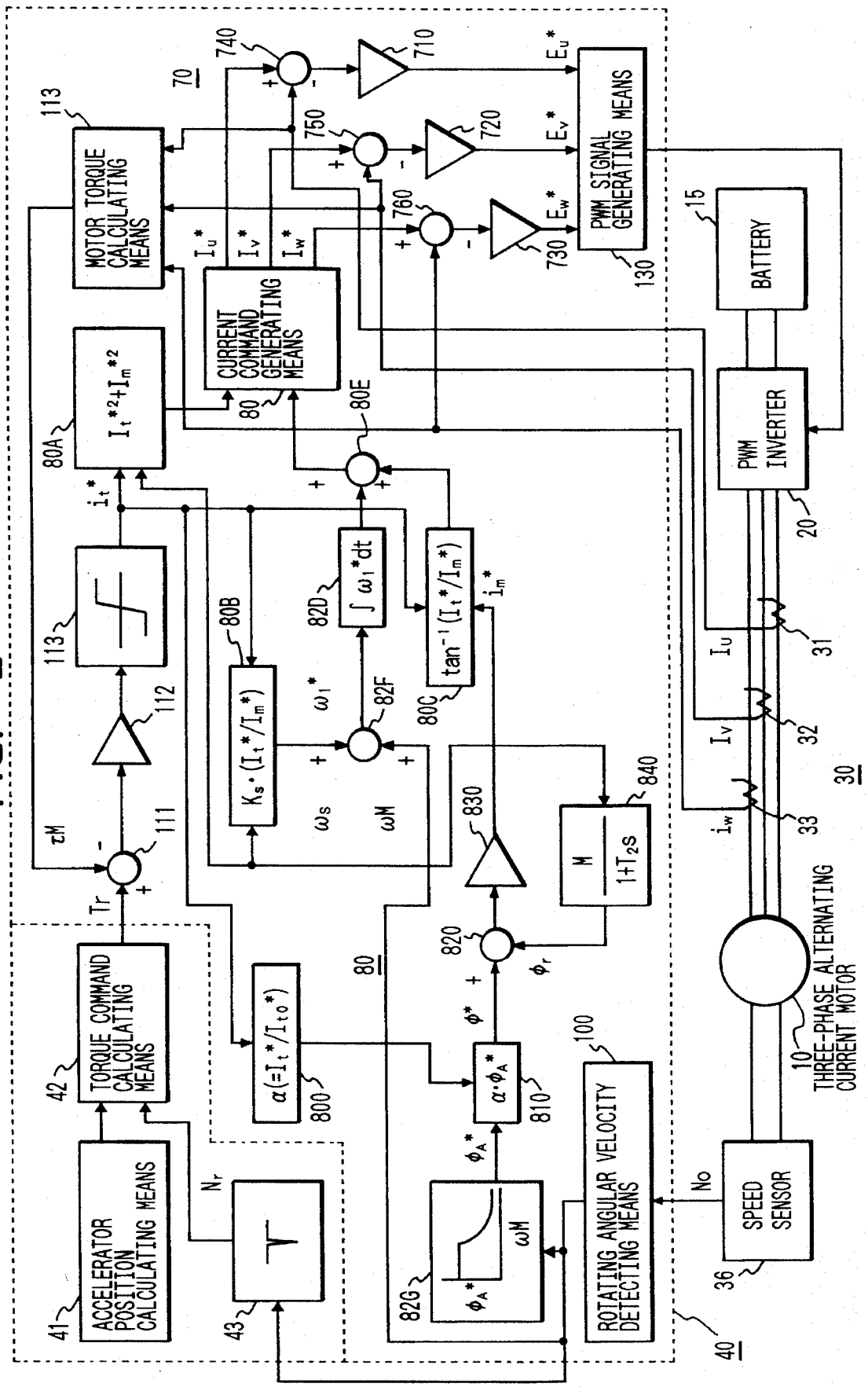
FIG. 2 is a diagram showing in detail a torque control means of FIG. 1.

FIG. 2 shows in detail the torque control means 40. In FIG. 2, the reference numeral 20 designates PWM inverter which produces the three-phase AC voltage both with a variable frequency and a variable voltage from the DC voltage of the battery 15, and controls the torque of a three-phase AC motor 10. Numeral 30 designates the current sensor which detects the primary current (iu, iv, iw) of the three-phase alternating current flowing through the primary winding of the AC motor 10. The numeral 36 designates an encoder provided on the shaft of the AC motor 10. A current control means 70 controls to set the primary current detected by the current sensor 30 to the predetermined value. An alternating current command generating means 80 generates the command (iu*, iv*, iw*) to the current control means 70. A rotating angular velocity detecting means 100 detects the rotating angular velocity ω of the AC motor 10 from an A-phase pulse and a B-phase pulse. The numeral 110 designates a torque command calculating means which generates the torque command Tr based on the actuating amount of the accelerator 37. Numeral 130 PWM signal generating means in which the PWM signal is made on the basis of the output signal (Eu*, Ev*, Ew*) of the current control means.

The amount corresponding to the actuating amount of the accelerator is calculated by an accelerator position calculating means 121. Next, by using the result of calculation, the torque command Tr to be supplied to the three-phases AC motor 10 is calculated by the torque arithmetic means 110. The error between the torque command Tr and the motor torque tM is calculated by an adder-subtractor 111, and converted to the torque current command It* via a motor torque regulator 112 which includes PI (Proportional plus Integral) compensator, and a limiter 113.

The motor torque tM can be obtained by using the torque current It and the exciting current Im. These currents are obtained by d-q conversion of the current iu, iv and iw which are detected by the current sensors 31, 32 and 33, respectively.

$$tM=(3/2)\cdot P\cdot (M_2/M+I_2)\cdot Im\cdot It \quad (1)$$

where, P is the number of poles, M is magnetizing inductance and $I_2$ is a secondary leakage inductance.

The exciting current command Im* is determined as follows.

Firstly, the magnetic flux φR* corresponding to the rotating angular velocity ωM detected by the rotating angular velocity detecting means 10 is generated in the secondary circuit of the motor. A flux pattern generator 82G generates a constant flux pattern when the rotating angular velocity is smaller than the base speed, while it generates the flux pattern in inverse proportion to the rotating angular velocity when the rotating angular velocity is larger than the base speed. A secondary magnetic flux command φ* is obtained by multiplying the magnetic flux φR* by the load factor α (equation 2), using a multiplier 810.

$$\alpha = It^*/It^*0 \quad (2)$$

where, It* 0 is the rated torque current.

Next, the error between the secondary flux command φ* and the φ$_2$ (equation 3) is calculated by the adder and subtractor 820, in which the φ$_2$ is the secondary magnetic flux generating in the secondary circuit of the AC motor 10 estimated by the secondary magnetic estimater.

$$\phi_2 = (M\cdot Im^*)/(1+T_2\cdot s) \quad (3)$$

where, $T_2$ (=(M+I$_2$) / r$_2$) is a secondary time constant, and r$_2$ is a secondary resistor.

The slip angular frequency ωs (equation 4) and the phase θ1 (equation 5) are calculated by arithmetic units 80B and 80C, respectively, using the torque current command It* and the exciting current command Im*.

$$\omega s = Ks\cdot (It^*/Im^*) \quad (4)$$

where, Ks =r$_2$/ (M+I$_2$).

$$\theta_1 = \tan^{-1}(It^*/Im^*) \quad (5)$$

The angular frequency ω$_1$ (primary angular frequency) of the AC command is obtained by adding the slip angular frequency ωs to the rotating angular velocity ωM (ω=2π·N/60), using an adder 82F. The instateneous phase of the AC command is obtained by integrating the primary angular frequency ω$_1$*, using an integrator 82D.

The phase of the alternating current command is obtained by adding the instataneous phase to the phase θ$_1$ in the adder 80D. The magnitude of the alternating current command is obtained by the calculation in the adder 80A. The current command generator 80 generates the three-phase alternating current commands, iu*, iv* and iw*, on the basis of those obtained values. The reference signals, Eu*, Ev* and Ew*, to generate the PWM signal, are generated by a current control means 70 so that the three-phase alternating currents, iu*, iv* and iw*, can follow the alternating current commands. The current control means 70 includes adders and subtractors 740, 750 and 760, and PI compensators 710, 720 and 730.

The PWM signal generating means 130 obtains the PWM signal by comparing the reference signals with a triangular wave. The gate signals are formed on the basis of the resultant PWM signal, which are supplied to six power elements that form the arms of a PWM inverter 20.

Figure 3:
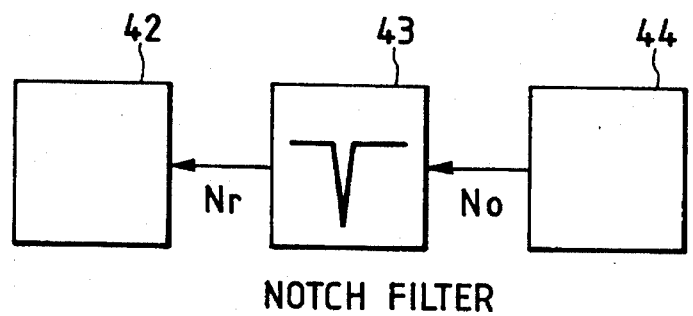
FIG. 3 is a diagram illustrating the characteristic of a notch filter.
Figure 5:
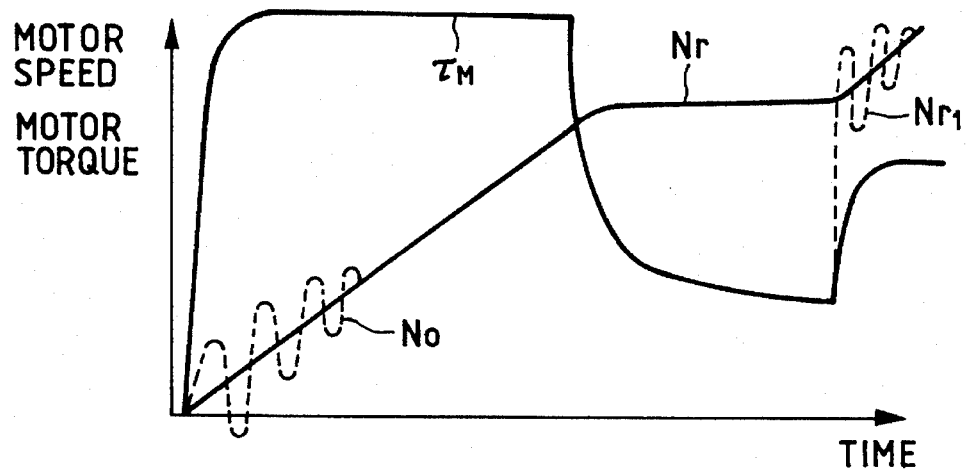
FIG. 5 is a graph showing the relation between the motor speed N and a motor torque tM.

As shown in FIG. 3, the notch filter 43 has the attenuation area in the neighborhood of the resonance frequency fr of the electric vehicle. The motor torque tM and the motor speed N varies during sudden acceleration as shown in FIG. 5. Therefore, the motor speed No including the resonance frequency detected by an encoder 36 varies as shown at dotted line in FIG. 5. If the torque command is obtained from an Nr-Tr map which generates the torque command, using the motor speed No including the vibration component, the torque command may varies as indicated at Tr1. As a result, the motor speed becomes more unstable and the driver becomes to feel remarkable unpleasure.

Figure 4:
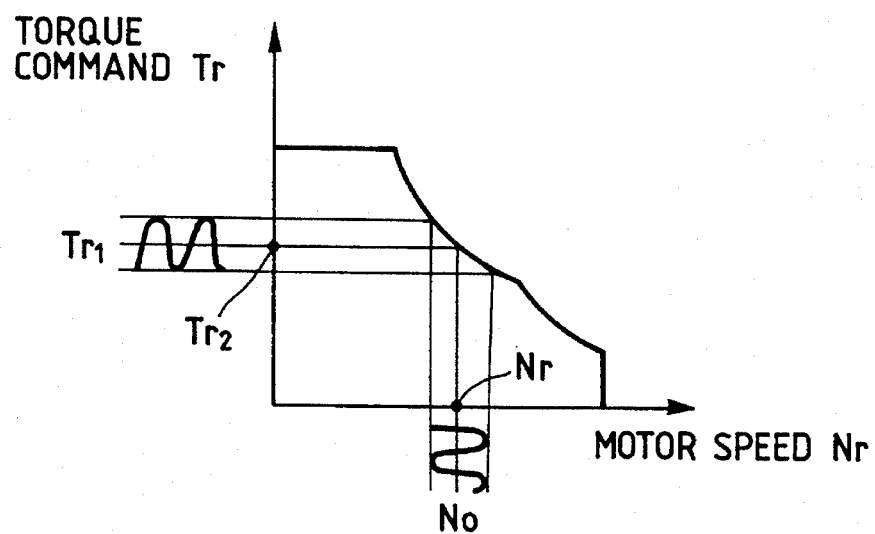
FIG. 4 is a graph showing the relation between the motor speed N and a torque command Tr in the torque control means.

According to the present invention, the effect of the resonance frequency fr can be reduced by the notch filter 43. Therefore, the stable torque command Tr2 corresponding to the Nr can be obtained as indicated at the solid line in FIG. 4. Namely, the torque command generating means 42 used in the control equipment according to the present invention, can always generate the stable torque command Tr.

While the electric vehicle has one specific resonance frequency in the embodiments described hereinbefore, the resonance frequency of the electric vehicle may change over time. Further, the electric vehicle may have a plurality of resonance frequencies owing to the effects of tires, etc.

Figure 6:
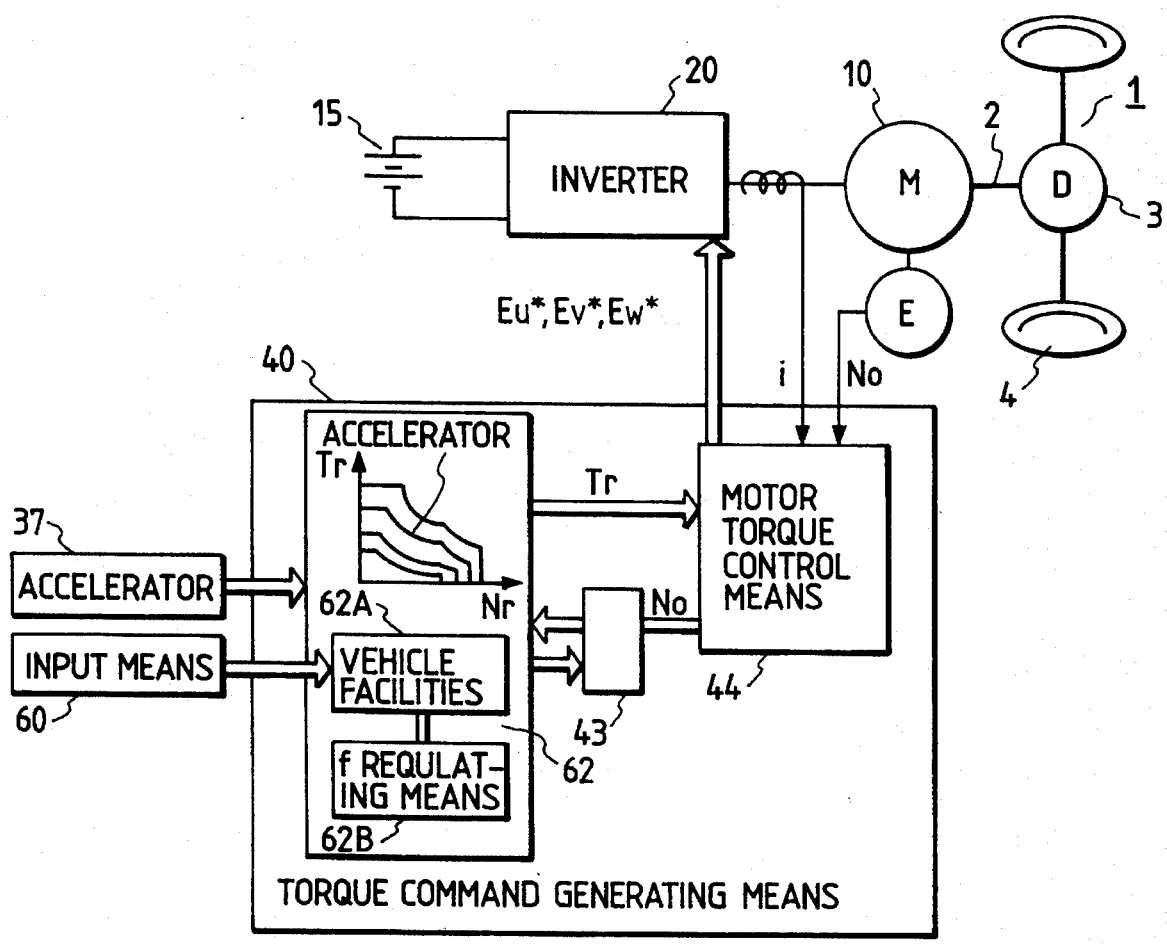
FIG. 6 is a block diagram showing another embodiment of the present invention, in which the notch filter is constructed by a software.
Figure 7:
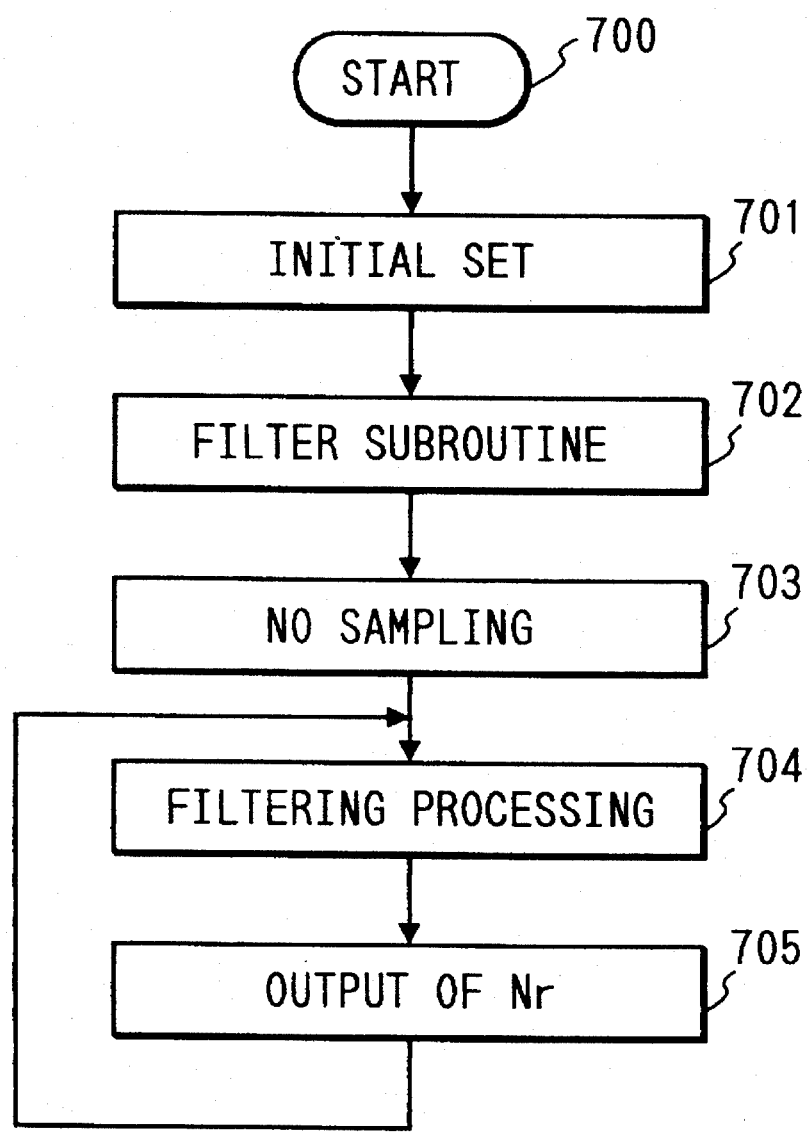
FIG. 7 is a flow chart showing the operation of the embodiment of FIG. 6.

FIGS. 6 and 7 show the modifications which can cope with such situations. In FIG. 6, the torque command generating means 42 is provided with means 62 for regulating the facilities of electric vehicle. The facility regulating means 62 includes a memory 62A for storing the data on the mechanical resonance frequency f and the facilities such as the type of electric vehicle, and f the regulating means 62B for changing the characteristics of the notch filter 43 on the basis of the data stored in the memory. The resonance frequency is obtained in advance, and inputted via an input means 60. If there are a plurality of resonance frequencies, all of the frequencies are inputted.

Referring now to FIG. 7, there is shown the operation of the torque command generating means 42 including the facility regulating means 62.

Firstly, the initial set data is read at step 701. If there is change in data, the processing shifts to step 702 and the filter subroutine processing is executed. Namely, if the resonance frequency f is set initially, or changed, the frequency to be eliminated by a filter is set at step 702. Next, at step 703, the motor speed No is input, and the filtering processing is executed at step 704. After the motor speed Nr was outputted, the processing shifts back to step 703. If a plurality of resonance frequencies, $f_1, f_2, \ldots$ are set, the filtering processing is executed on each of the resonance frequencies at step 704.

According to the present embodiment, it becomes easy to cope with the change over time and/or a plurality of resonance frequencies.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

We claim:

1. In an electric vehicle comprising a battery, a motor to drive wheels, and a control equipment for controlling a current to said motor, said control equipment comprising:

a motor torque control means for inputting the motor speed No detected by an encoder and the motor current detected by a current sensor, and generating an inverter drive signal to control the torque of said motor, on the basis of a torque command;

a notch filter for eliminating at least one mechanical resonance frequency of the wheel drive system on the basis of the information of the motor speed No;

a torque command generating means for inputting the actuating amount of an accelerator and the motor speed Nr obtained through said notch filter, and generating the torque command.

2. A control equipment according to claim 1, said torque command generating means is provided with means for regulating facilities of electric vehicle which includes a memory for storing the data on said at least one mechanical resonance frequency and the facilities and means for changing the characteristic of said notch filter on the basis of the data stored in the memory.

3. A control equipment according to claim 1, said motor torque control means is provided with vibration suppression control means for controlling the current to the motor, so as to suppress the vibration of the electric vehicle caused by the mechanical resonance.

4. In a method of controlling an electric vehicle which comprises a battery, a motor to drive wheels, means for detecting a motor speed No, a current sensor for detecting the current to said motor, and a control equipment for controlling the current to said motor, the control equipment including torque command generating means and motor torque control means, comprising the steps of:

obtaining a motor speed Nr in which at least one mechanical resonance frequency is eliminated from a motor speed No by a notch filter;

obtaining a torque command by inputting an actuating amount of an accelerator and the motor speed Nr, and executing an arithmetic processing in said torque command generating means;

producing an inverter drive signal for controlling the motor torque on the basis of the motor speed Nr, the motor current and the torque command, in said motor torque control means.

5. A control method according to claim 4, wherein said torque command generating means executes the processing for changing the frequency to be eliminated by the notch filter, on the basis of data change in the memory storing the data on the mechanical resonance frequency or facilities of the electric vehicle.

\* \* \* \* \*